US009667050B1

(12) United States Patent
Vrame

(10) Patent No.: US 9,667,050 B1
(45) Date of Patent: May 30, 2017

(54) CONDUIT TO BOX UNITARY SUPPORT BRACKET ASSEMBLY

(71) Applicant: Peter A Vrame, Wood Dale, IL (US)

(72) Inventor: Peter A Vrame, Wood Dale, IL (US)

(73) Assignee: S-P PRODUCTS, INC., Elk Grove Village, IL (US)

( * ) Notice: Subject to any disclaimer, the term of this patent is extended or adjusted under 35 U.S.C. 154(b) by 377 days.

(21) Appl. No.: 14/499,104

(22) Filed: Sep. 27, 2014

(51) Int. Cl.
H02G 3/18 (2006.01)
H02G 3/22 (2006.01)
H02G 1/08 (2006.01)

(52) U.S. Cl.
CPC ............ *H02G 3/22* (2013.01); *H02G 1/08* (2013.01)

(58) Field of Classification Search
CPC  H02G 3/20; H02G 3/08; H02G 3/081; H02G 3/18; H02G 3/22; H02G 3/26; H02G 3/28; H02G 3/32; H02G 1/08
USPC .......... 174/50, 68.1, 68.3, 72 R, 71 R, 88 R, 174/70 C, 95, 58, 651; 220/3.2, 3.9, 220/4.02; 248/906, 343, 317, 68.1, 49, 248/56
See application file for complete search history.

(56) References Cited

U.S. PATENT DOCUMENTS 2,855,648 A * 10/1958 Jansson ................ F16L 3/227
248/68.1
4,842,156 A 6/1989 Nattel
5,067,677 A * 11/1991 Miceli .................. H02G 3/26
248/68.1
5,354,952 A 10/1994 Hickey
5,971,329 A 10/1999 Hickey
D449,218 S 10/2001 Vrame
D480,948 S 10/2003 Patrizzi et al.
6,723,918 B2 * 4/2004 Vrame .................. H02G 3/123
174/50
7,014,152 B2 * 3/2006 Grendahl ............... H02G 3/32
248/68.1
D531,010 S 10/2006 Vrame
D598,731 S 8/2009 Dinh
(Continued)

OTHER PUBLICATIONS

Conduit & Box Support Plates Cat# CSP2W-WCm, Cat# CSP1/2-WC, Cat# CSP4W-WC, S-P Products, Elk Grove Village, IL, Jun. 10, 2013.

(Continued)

*Primary Examiner* — Angel R Estrada
(74) *Attorney, Agent, or Firm* — Patents and Licensing LLC; Daniel W Juffernbruch

(57) ABSTRACT

An apparatus for conduit to box unitary support bracket uses a plate. An electrical conduit box has end knockout openings on sides thereof, each end knockout opening having an elevation and size and location. The plate is disposed substantially perpendicular to said end knockout openings and comprising rows of thin, selectively bendable fingers bent towards the knockout openings to support at least one wire carrier in alignment with an elevation and size and location of corresponding end knockout openings. A method of assembling bends tabs on the plate 90 degrees, installs a connector in an end knockout on a side of the box, bends in a direction toward the electrical conduit box a plurality thin metal rowed fingers on the tab, secures the box to the plate, and feeds a wire carrier through the tabs, resting on the metal fingers bent and feeds the wire carrier into the connector.

20 Claims, 6 Drawing Sheets

(56) References Cited

U.S. PATENT DOCUMENTS

| | | |
|---|---|---|
| D612,226 S | 3/2010 | Dinh |
| 7,699,283 B2 * | 4/2010 | Vrame .................... H02G 3/20 |
| | | 248/906 |
| 7,823,846 B2 * | 11/2010 | Williams, III ....... H02G 3/0493 |
| | | 248/68.1 |
| 8,403,289 B1 | 3/2013 | Rinderer |
| 8,424,827 B2 | 4/2013 | Dinh |
| D731,292 S | 6/2015 | Vrame |
| 2005/0067546 A1 | 3/2005 | Dinh |

OTHER PUBLICATIONS

MSDS and Installation Procedures for CSP-4W-WC, S-P Products, Elk Grove Village, IL, Jan. 2014.
Orbit Box & Hanger Support Cat No. BCHS-10, Orbit Industries, Inc. Los Angeles, CA, 2014.

* cited by examiner

CONDUIT TO BOX UNITARY SUPPORT BRACKET ASSEMBLY

BACKGROUND OF THE INVENTIONS

1. Technical Field

The present inventions relate to supporting an electrical junction box and associated conduits and, more particularly, relate to a unitary support bracket therefore.

2. Description of the Related Art

In the typical construction of a building structure, electrical wiring for the structure is typically routed through various conduits, with the conduits commonly joined to an electrical conduit box, within which suitable electrical connections or the like are provided. As will be recognized by those familiar with the art, typical building codes require that such conduits and electrical conduit boxes meet certain structural requirements, including spacing, support, and like requirements.

Heretofore, support of an electrical conduit box, and one or more associated conduits, has typically required that a suitable arrangement of support brackets, clamps, fasteners, and the like be employed to ensure that the electrical components meet the applicable building codes. As such, installation of typical electrical conduit boxes and conduits can be relatively time-consuming, as workers must fit and assemble the various brackets, clamps, and like components to ensure that the resultant structure is in accordance with industry standards.

What is needed is a conduit support system including an improved support bracket for an electrical conduit box, and one or more associated conduits, which particularly facilitates efficient installation of such components, while at the same time, permitting the arrangement to be customized, as may be required, for use with a wide variety of different configurations of an electrical conduit box and conduit elements.

BRIEF DESCRIPTION OF THE DRAWINGS

The present inventions are illustrated by way of example and are not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein.

DETAILED DESCRIPTION OF THE PREFERRED EMBODIMENTS

Figure 1:
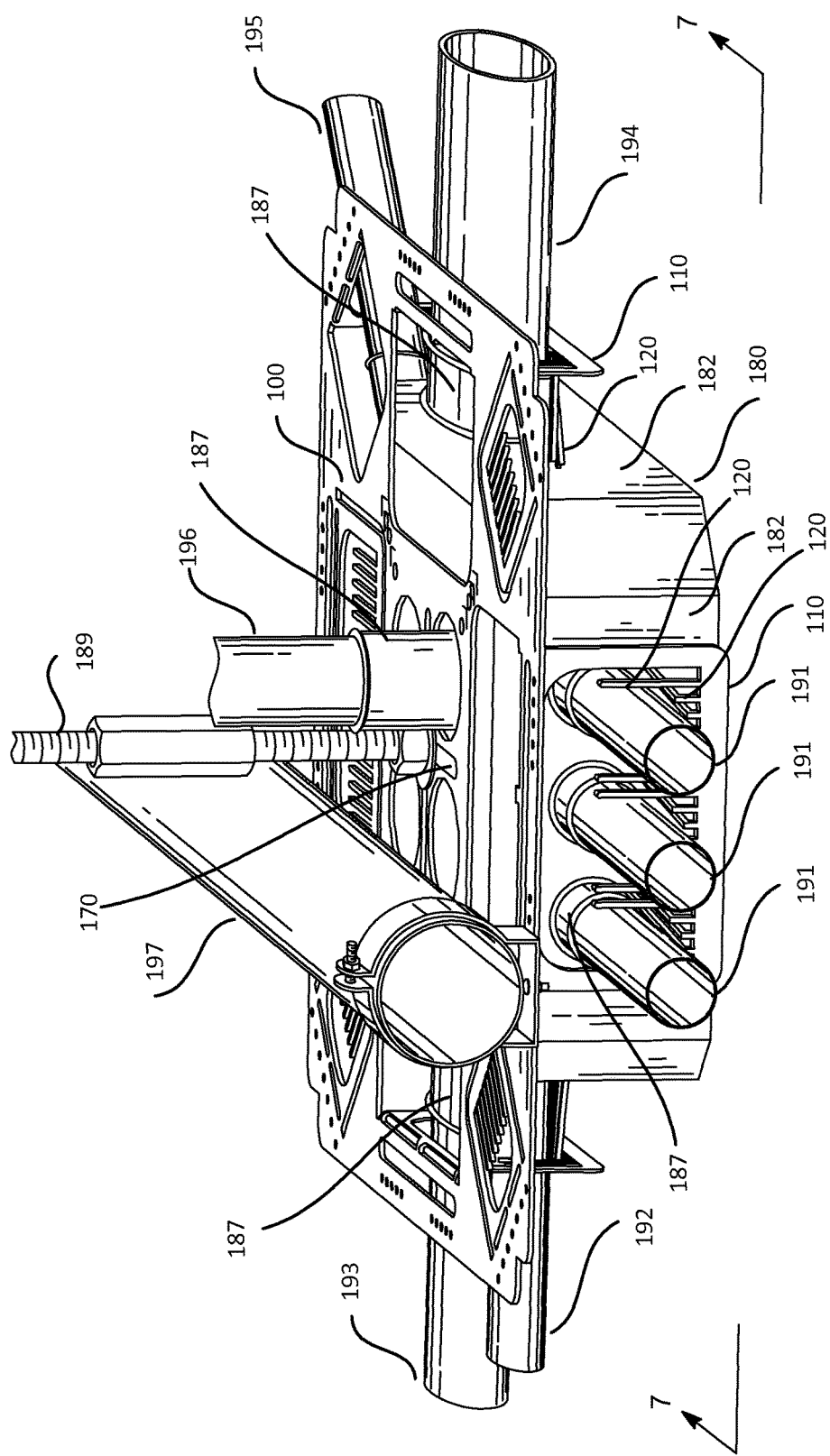
FIG. 1 illustrates a perspective of a conduit support system according to exemplary embodiments of the present inventions.

FIG. 1 illustrates a perspective view of a conduit support system embodying the principles of the present invention, wherein the support system has been configured for use with an electrical conduit box 180 having associated conduits 191, 192, 193, 194, 195, 196 and 197 of different sizes and locations extending horizontally and vertically thereof, with the system including a vertical support rod element 189 for positioning the system in an associated structure according to exemplary embodiments of the present inventions. The conduit support bracket or plate 100 is a unitary support bracket for an electrical conduit box 180, which can be selectively configured to facilitate efficient and convenient assembly and support of associated conduits, including conduits extending in four or more different horizontal directions from the electrical conduit box, as well as one or more conduits extending vertically therefrom.

The National Electrical Code requires all conduits or flexible MC Cable (whips) be supported within 3' and the Federal rule within 1' of the box. The disclosed conduit support system embodiments meet these requirements. The conduit support system can be used in a 1-way, a 2-way, a 3-way, a 4-way, or an 8-way configuration in a ceiling or a wall.

Couplers 187 have opposite ends for securing conduit in knockouts on the electrical conduit box 182. One end of a coupler 187 screws into the knockout and another end has a sleeve for coupling with one of the conduits 191, 192, 193, 194, 195, 196 and 197 or MC Cable.

The electrical conduit box 180 has end knockout openings on sides 182 thereof. Each end knockout opening has an elevation and size and location. A plate 100 is disposed substantially perpendicular to said end knockout openings. The plate 100 has rows of thin, selectively bendable fingers 120. Certain of the thin, selectively bendable fingers 120 as illustrated are bent towards the knockout openings to support the illustrated wire carriers such as conduits 191, 192, 193, 194 and 195 in alignment with an elevation and size and location of corresponding end knockout openings. The selectively bendable fingers 120 have tips bent in a direction towards the wire carriers such as conduits 191, 192, 193, 194 and 195. A plurality of the selectively bendable fingers 120 contacts the wire carriers to adjustably hold the wire carriers in both a selective horizontal orientation and a selective vertical orientation.

Wide finger support tabs 110 in the plate 100 are each coupled to a main body of the plate. Each of the wide finger support tabs 110 have a respective one of the rows of thin, selectively bendable fingers 120.

Openings 105 in the sheet metal accommodate bend down tabs 110 and are U-shaped in the illustrated embodiments. Wide openings 129 in the sheet metal accommodate rows of narrow bend down fingers 120. One row of narrow bend down fingers 120 is provided in the sheet metal on each of at least four sides of box can support conduit or MC cable at any knockout on all sides of the electrical conduit box to allow feeding conduit or flexible whips thru the openings and be attached to connectors installed in knockouts on the electrical conduit box. Example sizes are ½" thru 1¼ inch "conduit or size 14/2 thru 2C-2/0 MC or 3/C-3/cable. These four rows of rows of narrow bend down fingers 120 eliminate the labor and material cost for up to eight or more conduit clamps. In one preferred embodiment about 18 fingers per tab on each of four sides are 0.125 inch apart and 0.062 inches wide of galvanized steel of 18 gauge or 20 gauge. In an embodiment, during assembly configuration, fingers 120 are bent towards the electrical conduit box to save space or permit easier assembly.

The wide finger support tabs 110 are bent substantially perpendicular to the plate 100 and substantially parallel to the sides of the electrical conduit box 180. Each of the wide finger support tabs 110 are bent in a direction away from the electrical conduit box 180 when bent substantially perpendicular to the plate 100 and substantially parallel to the sides 182 of the electrical conduit box 180. Each of the rows of thin, selectively bendable fingers 120 are bent to point in a direction substantially opposite of the direction that each of the wide finger support tabs 110 are bent.

Each of the wide finger support tabs 110 are coupled to a main body of the plate 100 at a distal locations from a side of the electrical conduit box 180. Each of the wide finger support tabs 110 are bent away from the electrical conduit box 180 when bent substantially perpendicular to the plate 100 and substantially parallel to the sides 182 of the electrical conduit box 180.

The thin, selectively bendable fingers 120 are punched in sheet metal of the tab 110 of the plate 100, each with a width of approximately 0.062 inches in one embodiment. The selectively bendable fingers 120 are approximately 0.125 inch apart in one embodiment. It is best to bend the selectively bendable fingers 120 towards the electrical conduit box 180.

The choice of which fingers 120 are bent accommodates different horizontal positioning of various knockout locations of various electrical boxes. The degree of bend accommodates different vertical positioning of various knockout locations of various electrical boxes. Conduits 191, 192, 193, 194 and 195 are of different sizes. Conduits 191 and 192 are ½ inch diameter conduit. Conduit 195 is ¾ inch diameter conduit. Conduit 193 is 1 inch diameter conduit. Conduit 194 is 1¼ inch diameter conduit. Therefore a universal support bracket or plate 100 is provided by the rows of thin, selectively bendable fingers 120.

The electrical conduit box 182 can have any number of different size knockouts in odd locations either vertically or horizontally. Because conduits or MC cable to any unknown electrical conduit box can be supported by one plate, embodiments of the present inventions truly provide a universal support bracket or plate heretofore unknown. Because the plate is universal, planning, fabrication, installation, and re-configuration times are greatly reduced, reducing expansive labor costs using this one metal plate.

Figures 2, 3:
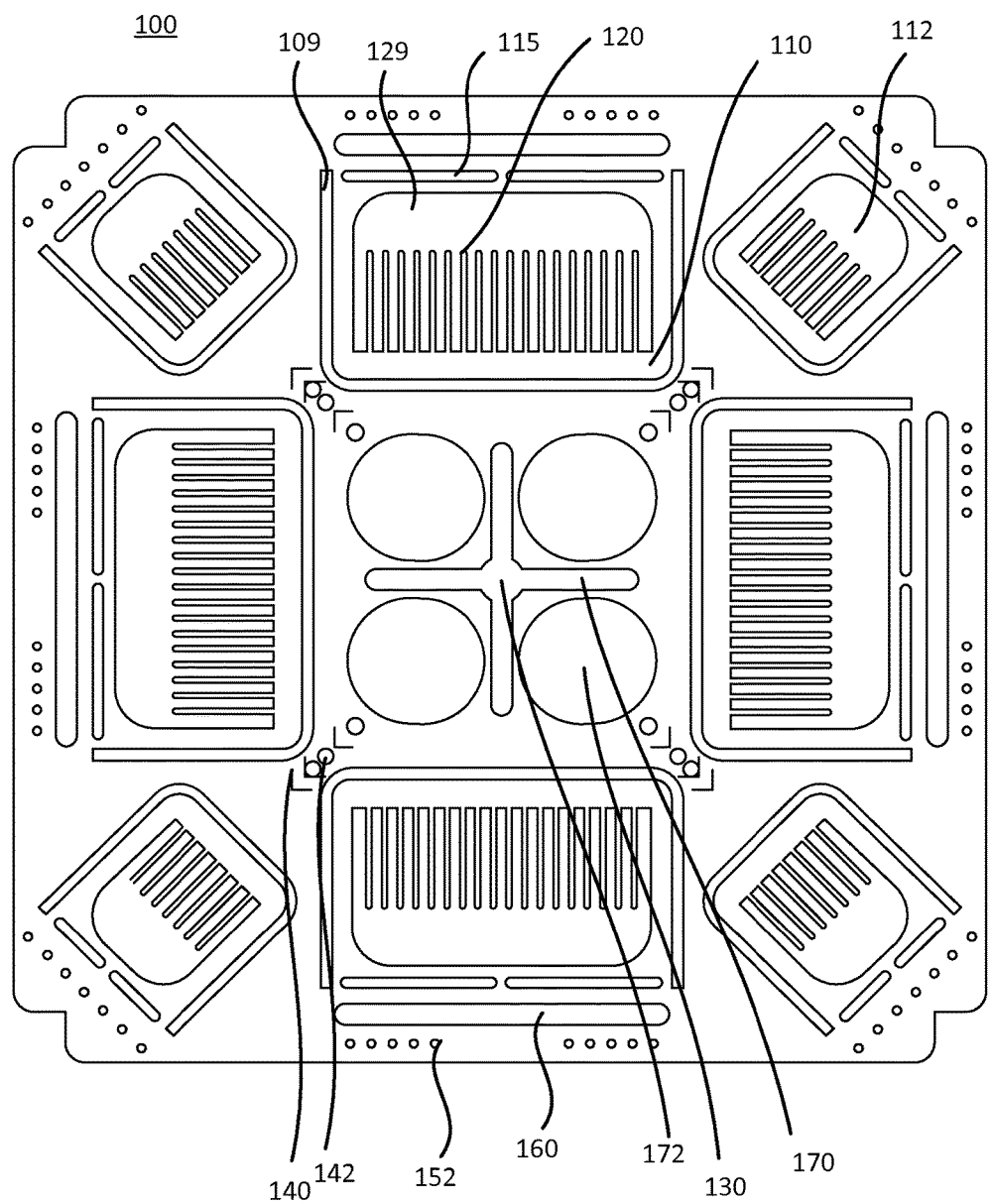
FIG. 2 illustrates a top plan view of a conduit support bracket according to exemplary embodiments of the present inventions.
FIG. 3 illustrates a side elevational view of the support bracket shown in FIG. 2 according to exemplary embodiments of the present inventions.

A row of thin, selectively bendable fingers has between four and twenty one fingers in one embodiment, has between fourteen and twenty one fingers in another embodiment and in the illustrated embodiment of FIG. 2 has 18 fingers in the wider rows on the sides and 7 fingers on the narrower rows in the corners.

The electrical conduit box and plate 100 can be fastened to a building structure with a threaded rod, beam clamp, etc. Open slotted cross slots 170 permit adjustment of a hang location for the electrical conduit box 180 when fastening it to a vertical support threaded rod element 189. Open slotted cross slots 170 in the center of the plate 100 are approximately ¼ inch wide to allow the plate to be moved in directions required.

The plate 100 of the embodiments of the present inventions allows supporting conduit connected to other systems such as fire, security, data, etc. routed above the electrical conduit box from a same vertical support threaded rod element 189.

FIG. 2 illustrates a top plan view of a conduit support bracket or plate 100. The illustrated support bracket or plate 100 is shown prior to deformation of members of the bracket or plate 100 for installation and an assembly with an associated electrical conduit box and conduit according to exemplary embodiments of the present inventions. The conduit support bracket or plate 100 is a unitary support bracket for an electrical conduit box, which can be selectively configured to facilitate efficient and convenient assembly and support of associated conduits, including conduits extending in four or more different horizontal directions from the electrical conduit box, as well as one or more conduits extending vertically therefrom.

Markings 140 and holes 142 at each corner allow an assembler to quickly center and attach electrical conduit boxes in prefabrication shops. Markings 140 aide the quick location of the 4", 4¹¹/₁₆" & 5" square electrical conduit boxes or other size electrical conduit boxes on a center of the plate 100 when attaching them together in a prefab shop or on a jobsite. Pilot holes 142 for TEK screws help quickly attach 4"×4", 4¹¹/₁₆"×4¹¹/₁₆", 5"×5" or other size electrical conduit boxes to the plate 100 in a prefab shop—before they're attached to building on jobsite.

Wide open slots 160 at every end are for instance approximately ¼ inch wide by approximately 4 inch long to attach conduit clamps with for instance ¼ inch nuts and bolts at any location. The open slots 160 placed near every large tab allow clamps to support conduit above. The open slots 160 run the width of the wide bend down tabs as an alternate to allow attaching expensive and labor intensive conduit clamps with ¼ inch nuts and bolts if job specifications require.

Four large openings 130 allow connectors to perfectly seat for a positive ground when coming in and out back of electrical conduit boxes with conduit or flexible "whips". This also eliminates time it takes to cut out knockouts in contractors shop or on jobsite. The large openings 130 in an embodiment are oversized elliptical openings 130 are provided in a center of the plate. The oversized elliptical openings 130 allow an entire connector to seat flat on box for a more reliable and positive ground. The oversized elliptical openings 130 also eliminate cutting knockouts KOs when going in and out back of electrical conduit boxes.

Narrower corner bend down conduit support tabs 112 can allow the same installation for conduit and flexible whip support when entering square, round or octagon boxes at an angle. Four of the narrower corner bend down conduit support tabs 112 in on embodiment are placed one in each corner at a 45 degree angle allows.

Closely spaced fingers 120 in all 8 bend down tabs at can be bent down toward the electrical conduit box to serve as a conduit or MC Cable support. Four wide tabs (1 on each side of box) allow conduit and flexible MC Cable to be supported at any one or more knockout location and four tabs at a 45 degree angle allow conduit and flexible MC Cable to also be supported at an angle depending on when using square, round or octagon boxes.

Open slots 115 at the base of each of the bend down conduit support tabs 110 allow easy bending down away from the electrical conduit box at a 90 degree angle (perpendicular to the plate 100) with no distortion.

TEK screw holes 152 at the base of all 8 bend down tabs are closely spaced and small enough to receive support screws for clamps facing above for supporting conduit and for other hardware, for example purposes of fire, temperature, data and other systems, above the plate 100.

The electrical conduit box and plate 100 can be fastened to a building structure with a threaded rod, beam clamp, etc. at point 172. Open slotted cross slots 170 permit adjustment of a hang location for the electrical conduit box 180 when fastening it to a vertical support threaded rod element.

FIG. 3 illustrates a side elevational view of the support bracket or plate 100 shown in FIG. 2 according to exemplary embodiments of the present inventions.

Figure 4:
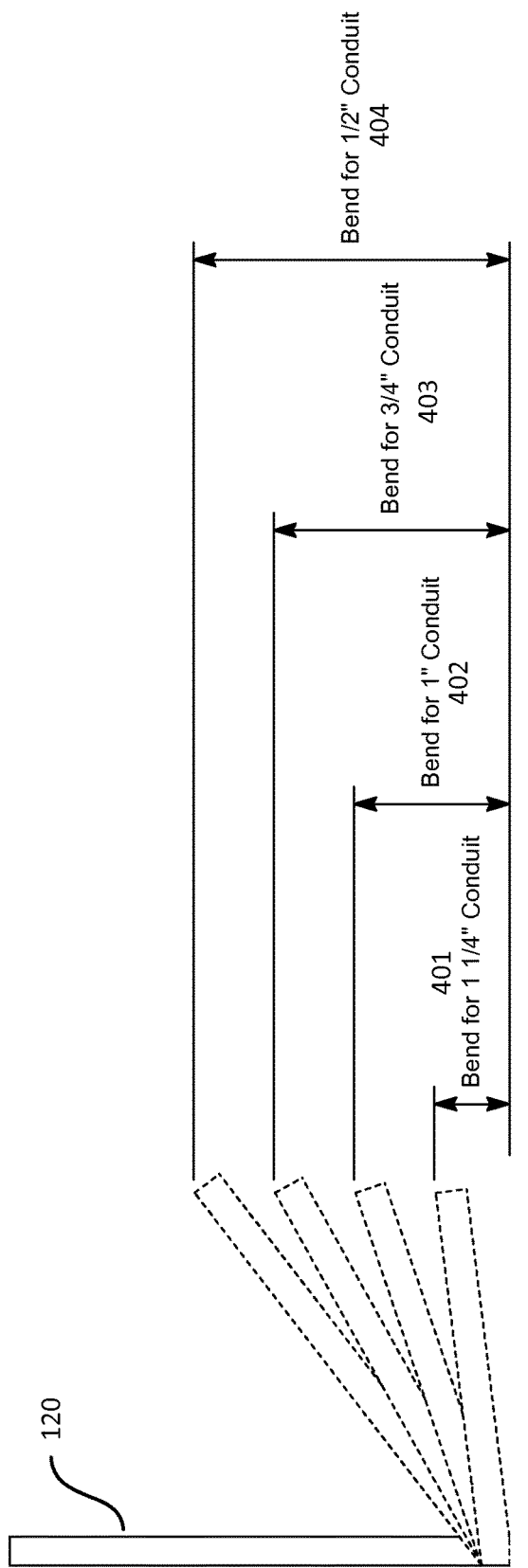
FIG. 4 illustrates a side view of one finger at various exemplary bend angles to support various size and locations of conduits or MC cables in the conduit support system according to exemplary embodiments of the present inventions.

FIG. 4 illustrates a side view of one finger 120 at various exemplary bend angles to support various size and locations of conduits or MC cables in the conduit support system according to exemplary embodiments of the present inventions. The slightest bend 404 illustrated accommodates a ½" conduit or equivalent diameter MC cable. The next slightest bend 403 illustrated accommodates a ¾" conduit or equivalent diameter MC cable. The next bend 402 illustrated accommodates a 1" conduit or equivalent diameter MC cable. The furthest bend 401 illustrated accommodates a 1¼" conduit or equivalent diameter MC cable.

Besides different sizes, the degree of bend also accommodates different vertical positioning of various knockout locations of various electrical boxes. The choice of which fingers 120 are bent also accommodates different horizontal positioning of various knockout locations of various electrical boxes. Therefore a universal support bracket or plate 100 is provided by the rows of thin, selectively bendable fingers 120. The electrical conduit box 182 can have any number of different size knockouts in odd locations either vertically or horizontally. Because conduits or MC cable to any unknown electrical conduit box can be supported by one plate, embodiments of the present inventions truly provide a universal support bracket or plate heretofore unknown. Because the plate is universal, planning, fabrication, installation, and re-configuration times are greatly reduced, reducing expansive labor costs using this one metal plate.

Figure 5:
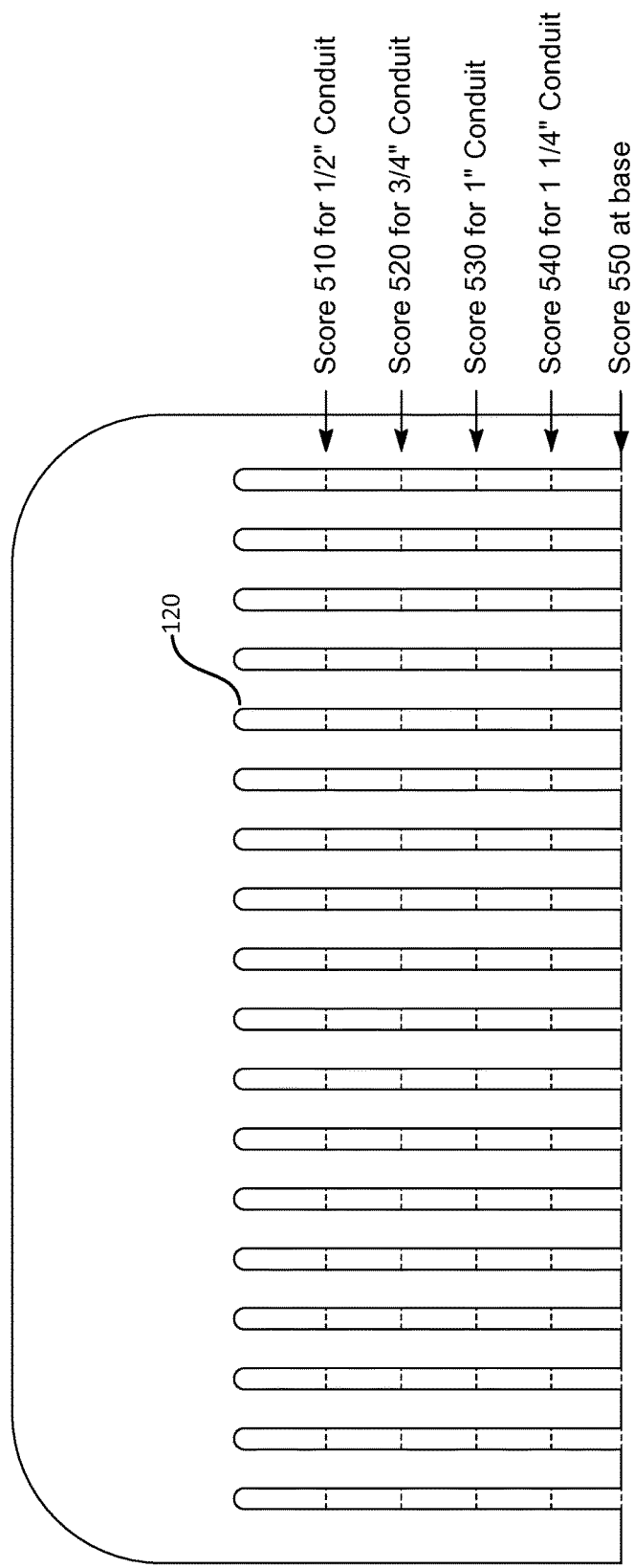
FIG. 5 illustrates a top plan view of the fingers of one tab in a conduit support bracket according to exemplary embodiments of the present inventions.

FIG. 5 illustrates a top plan view of fingers 120 of one tab in a conduit support bracket according to exemplary embodiments of the present inventions. Each of the selectively bendable fingers 120 are scored at a base 550 of a corresponding wide finger support tabs on a side away from the bend direction. It is best to bend the selectively bendable fingers 120 towards the electrical conduit box 180. Because fingers 120 are scored at their base 550 easier bending with less distortion is achieved. The scores are on the side away from the direction of the bend.

In further embodiments, the fingers 120 can be scored to assist matching predetermined sizes of conduit. For example, as illustrated, a score 510 is illustrated for a ½" conduit or equivalent. For example, as illustrated, a score 520 is also illustrated for a ¾" conduit or equivalent. For example, as illustrated, a score 530 is additionally illustrated for a 1" conduit or equivalent. For example, as illustrated, a score 540 is finally illustrated for a 1¼" conduit or equivalent. These scores 510-540 also assist in bending not just at the base but further down a finger 120 even when the conduit or other wire carrier is not exactly the same diameter.

In another embodiment the length of the fingers 120 to their ends can be approximated to the smallest diameter wire carrier or conduit so as to reduce or completely eliminate any bending except for larger diameter wire carriers.

Another reason bending may be needed beyond that normally expected is when unusually located knockouts or electrical conduit boxes need to be deployed, either planned or ad hoc or in emergencies. Any of various conduit box knock out hole elevations and sizes and positions can be accommodated.

Figure 6:
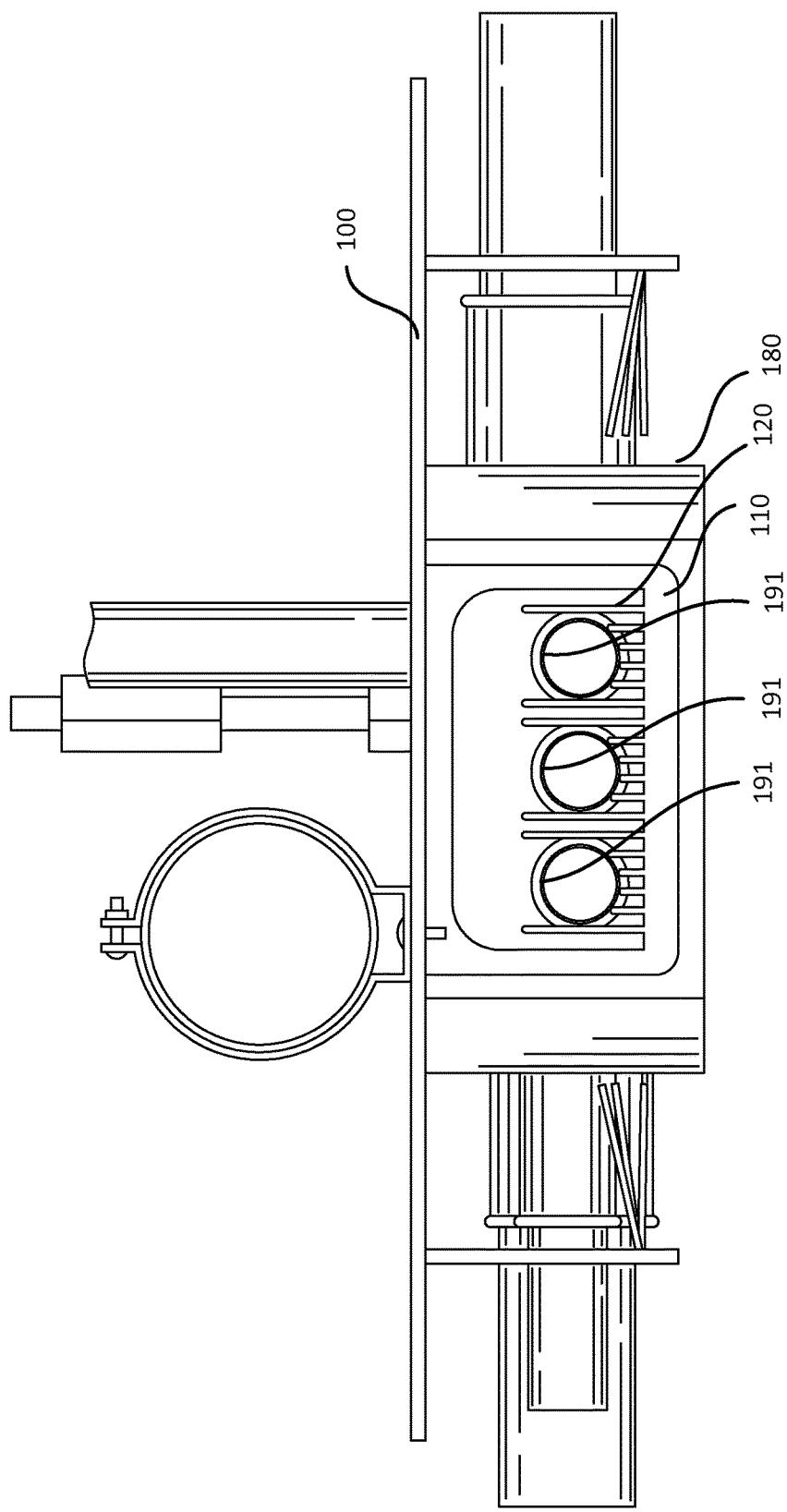
FIG. 6 illustrates a side view of a conduit support system according to exemplary embodiments of the present inventions.

FIG. 6 illustrates a side view of a conduit support system according to exemplary embodiments of the present inventions. In the embodiment illustrated, conduits 191 are coupled to electrical conduit box 180. The conduits 191 are supported by a row of selectably bent fingers 120. The row of selectably bent fingers 120 is part of tab 110 which was bent down 90 degrees perpendicular to plate 100. Other conduits of various different sizes and positions, both varying vertically and horizontally, are accommodated by the rows of selectably bent fingers.

Figure 7:
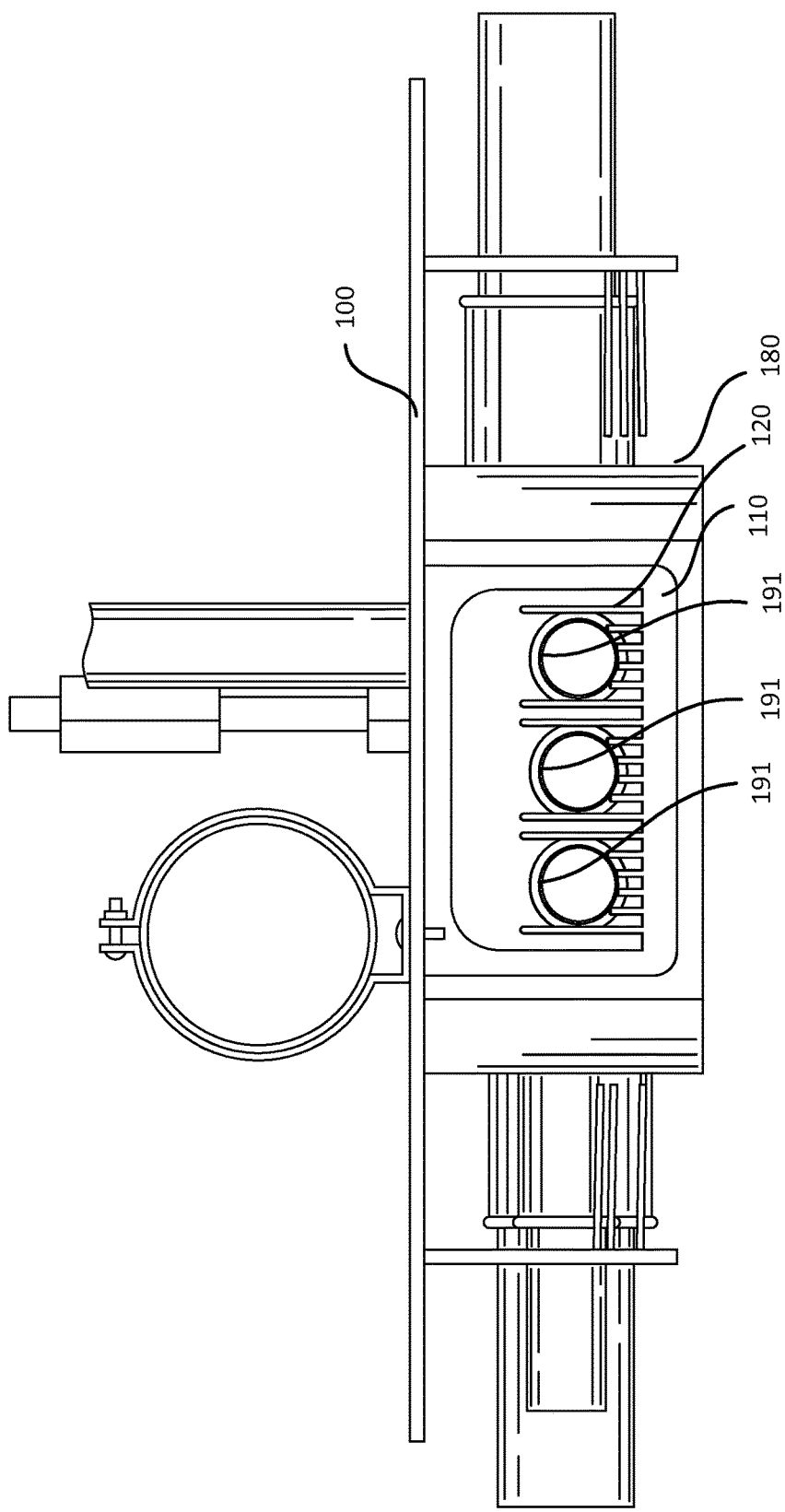
FIG. 7 illustrates a side view of the conduit support system of FIG. 1 according to exemplary embodiments of the present inventions.

FIG. 7 illustrates a side view of the conduit support system of FIG. 3 according to exemplary embodiments of the present inventions. The fingers are further bent in the illustration of FIG. 7 as compared to the degree of bending of the fingers in FIG. 6. When the scoring of the embodiments of FIG. 5 is deployed on or along the length of the fingers, different bend characteristics are achieved for even the same wire carrier or conduit. In the embodiment illustrated, conduits 191 are coupled to electrical conduit box 180. The conduits 191 are supported by a row of selectably bent fingers 120. The row of selectably bent fingers 120 is part of tab 110 which was bent down 90 degrees perpendicular to plate 100. Other conduits of various different sizes and positions, both varying vertically and horizontally, are accommodated by the rows of selectably bent fingers.

Steps for a method of fabrication and assembly are as follows:

Step 1. Bend wider tabs 110 down 90 degrees away from and then bend plurality thin metal rowed fingers 120 toward an electrical conduit box to serve as a platform for hard pipe or equivalent diameter of flexible MC Cable and conduit.

Step 2. Install connectors to the electrical conduit box on any knockout configuration, such as 4 inch, 4¹¹⁄₁₆ inch or 5 inch square shallow or deep electrical conduit boxes.

Step 3. Feed a wire carrier such as a conduit through large tabs to rest on metal fingers and attach into connectors installed at any knockout KO location on all 4 sides of electrical conduit box regardless of the configuration. (The wire carrier fed can be a ½ inch, ¾ inch, 1 inch or 1¼ inch hard pipe, flexible MC Cable or conduit.)

Step 4. Bend narrower tabs at each corner of box down 90 degrees and away from electrical conduit box to allow a wire carrier to be supported when entering round or octagon fixture, concrete boxes, etc. (The supported wire carrier can be ½ inch or ¾ inch hard pipe, or flexible MC Cable or conduit.)

In an alternate method, the fingers are not bent in step 1. Instead, the fingers are bent toward the electrical conduit box during step 3 when a conduit is shoved towards the box to be seated in to the connector. Additionally, the narrower tabs at each corner can be bent in step 1, rather than in step 4 near the end. It is also easiest to use when the plate is attached to the box after step 1 but before step 3 and preferably after step 2.

Any letter designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

Any trademarks listed herein are the property of their respective owners, and reference herein to such trademarks is generally intended to indicate the source of a particular product or service.

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

What is claimed is:

1. An apparatus for conduit to box unitary support bracket, comprising:
    an electrical conduit box comprising end knockout openings on sides thereof, each end knockout opening having an elevation and size and location; and
    a plate disposed substantially perpendicular to said end knockout openings and comprising opposing rows of thin, selectively bendable fingers bent towards the knockout openings to support at least one wire carrier in alignment with an elevation and size and location of corresponding end knockout openings, wherein each of the selectively bendable fingers are scored at a base of a corresponding wide finger support tab on a side away from the bend direction.

2. An apparatus for conduit to box unitary support bracket according to claim 1, wherein the selectively bendable fingers have tips bent in a direction towards the wire carrier and a plurality of the selectively bendable fingers contacts the wire carrier to adjustably hold the wire carrier in both a selective horizontal orientation and a selective vertical orientation.

3. An apparatus for conduit to box unitary support bracket according to claim 2, wherein the plate further comprises wide finger support tabs each coupled to a main body of the plate, each of the wide finger support tabs comprising a respective one of the rows of thin, selectively bendable fingers.

4. An apparatus for conduit to box unitary support bracket according to claim 3, wherein the wide finger support tabs are bent substantially perpendicular to the plate and substantially parallel to the sides of the electrical conduit box.

5. An apparatus for conduit to box unitary support bracket according to claim 1, wherein the thin, selectively bendable fingers each have a width of approximately 0.062 inches.

6. An apparatus for conduit to box unitary support bracket according to claim 1, wherein a row of the thin, selectively bendable fingers has between four and twenty one fingers.

7. An apparatus for conduit to box unitary support bracket according to claim 1, wherein a row of the thin, selectively bendable fingers has between fourteen and twenty one fingers.

8. An apparatus for conduit to box unitary support bracket according to claim 1, wherein the plate comprises at least two pair of opposing rows of thin, selectively bendable fingers, each pair corresponding to a respective of two sides of the electrical conduit box.

9. An apparatus for conduit to box unitary support bracket according to claim 8, wherein the plate comprises at least four pair of opposing rows of thin, selectively bendable fingers, each pair corresponding to a respective of four sides of the electrical conduit box.

10. An apparatus for conduit to box unitary support bracket according to claim 9, wherein the plate comprises at least eight pair of opposing rows of thin, selectively bendable fingers, each pair corresponding to a respective of eight sides of the electrical conduit box of an octagon shape.

11. An apparatus for conduit to box unitary support bracket according to claim 1, wherein the wire carrier is selected from the group consisting of conduit and MC cable.

12. An apparatus for conduit to box unitary support bracket according to claim 1, wherein the thin, selectively bendable fingers each have a width of approximately 0.062 inches.

13. An apparatus for conduit to box unitary support bracket according to claim 1, wherein a row of the thin, selectively bendable fingers has between four and twenty one fingers.

14. An apparatus for conduit to box unitary support bracket according to claim 1, wherein a row of the thin, selectively bendable fingers has between fourteen and twenty one fingers.

15. An apparatus for conduit to box unitary support bracket according to claim 1, wherein the plate comprises at least two pair of opposing rows of thin, selectively bendable fingers, each pair corresponding to a respective of two sides of the electrical conduit box.

16. An apparatus for conduit to box unitary support bracket according to claim 8, wherein the plate comprises at least four pair of opposing rows of thin, selectively bendable fingers, each pair corresponding to a respective of four sides of the electrical conduit box.

17. An apparatus for conduit to box unitary support bracket according to claim 9, wherein the plate comprises at least eight pair of opposing rows of thin, selectively bendable fingers, each pair corresponding to a respective of eight sides of the electrical conduit box of an octagon shape.

18. An apparatus for conduit to box unitary support bracket, comprising:
    an electrical conduit box comprising end knockout openings on sides thereof, each end knockout opening having an elevation and size and location; and
    a plate disposed substantially perpendicular to said end knockout openings and comprising opposing rows of thin, selectively bendable fingers bent towards the knockout openings to support at least one wire carrier in alignment with an elevation and size and location of corresponding end knockout openings, wherein the selectively bendable fingers have tips bent in a direction towards the wire carrier and a plurality of the selectively bendable fingers contacts the wire carrier to adjustably hold the wire carrier in both a selective horizontal orientation and a selective vertical orientation, wherein the plate further comprises wide finger support tabs each coupled to a main body of the plate, each of the wide finger support tabs comprising a respective one of the rows of thin, selectively bendable fingers, wherein the wide finger support tabs are bent substantially perpendicular to the plate and substantially parallel to the sides of the electrical conduit box, and wherein each of the wide finger support tabs are bent away from the electrical conduit box when bent substantially perpendicular to the plate and substantially parallel to the sides of the electrical conduit box and wherein each of the opposing rows of thin, selectively bendable fingers are bent to point in a direction substantially opposite of the direction that the each of the wide finger support tabs are bent.

19. An apparatus for conduit to box unitary support bracket according to claim 18, wherein each of the wide finger support tabs are coupled to a main body of the plate at a distal location from a side of the electrical conduit box and each of the wide finger support tabs are bent away from the electrical conduit box when bent substantially perpendicular to the plate and substantially parallel to the sides of the electrical conduit box.

20. An apparatus for conduit to box unitary support bracket according to claim 18, wherein each of the selectively bendable fingers are scored at a base of a corresponding wide finger support tab on a side away from the bend direction.

* * * * *